United States Patent

[11] 3,616,003

| [72] | Inventors | Tadao Kohashi<br>Yokohama;<br>Tadao Nakamura, Kawasaki-shi; Shigeaki Nakamura, Kawasaki-shi, all of Japan |
|---|---|---|
| [21] | Appl. No. | 794,677 |
| [22] | Filed | Jan. 28, 1969 |
| [45] | Patented | Oct. 26, 1971 |
| [73] | Assignee | Matsushita Electric Industrial Co., Ltd. Kadoma-shi, Japan |

[54] METHOD FOR MAKING PHOTOELECTRIC DEVICE
3 Claims, 3 Drawing Figs.

| [52] | U.S. Cl. | 156/182, 156/60, 156/90, 156/242 |
|---|---|---|
| [51] | Int. Cl. | B32b 31/00 |
| [50] | Field of Search | 156/90, 242, 60, 182 |

[56] References Cited
UNITED STATES PATENTS

| 2,387,759 | 10/1945 | Jarvis | 156/60 X |
| 3,056,898 | 10/1962 | Knochel et al. | 156/242 X |
| 3,342,655 | 9/1967 | Crounover | 156/242 X |

Primary Examiner—Benjamin R. Padgett
Attorney—Stevens, Davis, Miller & Mosher

ABSTRACT: A method for manufacturing a photoelectric device having a plurality of photoconductive layers comprising the steps of forming on a surface of a semimanufactured article a layer of mixed suspension material consisting of powdery photoconductive material, binder material and volatile diluent, volatilizing said volatile diluent, repeating these steps to laminate the desired number of layers, and subjecting the laminated layers to a single heat treatment, thereby to set the photoconductive layers simultaneously.

A photoelectric device including a spacer frame between the electrodes, said frame encircling at least one photoconductive layer.

PATENTED OCT 26 1971

3,616,003

INVENTORS
TADAO KOHASHI
TADAO NAKAMURA
SHIGEAKI NAKAMURA

BY Stevens, Davis, Miller & Mosher

ATTORNEYS

METHOD FOR MAKING PHOTOELECTRIC DEVICE

This invention relates to a photoelectric device and a method for manufacturing the same and more particularly to a method for manufacturing a photoelectric device having a composite laminate of photoconductive layers including the same or different kinds of powdery photoconductive materials and a device including a spacer frame.

It was found in general that in forming a photoconductive layer by thermal setting after mixing photoconductive into a binding agent, the sensitivity of the photoconductive material remarkably decreases if it is subjected to heat treatment more than once. When a composite laminate of photoconductive layers is to be made while maintaining high sensitivity, they should be set by a single-heat treatment. However, when two photoconductive layers are to be formed, it has been necessary to form and thermally set one layer and then form and thermally set the other layer thereon, therefore the first formed layer is inevitably subjected to heat treatment twice and the sensitivity thereof decreases.

This invention is to form two or more photoconductive layers only by a single-heat treatment without any significant deterioration in sensitivity.

This invention will be more clearly understandable by the following description made in connection with the accompanying drawing in which.

Figure 1:
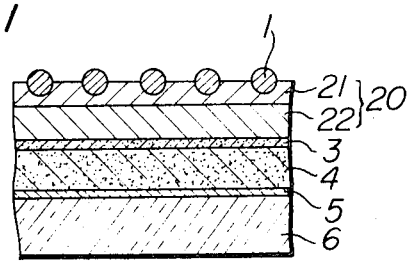
FIG. 1 shows a vertical cross section of a solid-state image converting device as an example of a photoelectric device.

FIG. 1 shows an example of a solid-state image converting device to be manufactured by this invention, which comprises a porous electrode 1, a first photoconductive layer 21, a second photoconductive layer 22, an intermediate layer 3 for preventing optical feedback, an electroluminescent layer 4, and a transparent electrode 5 coated on a transparent glass support 6. The transparent electrode 5 is formed of stannic oxide or the like and coated on the support 6. The electroluminescent layer 4 of about 50 μ is formed of electroluminescent phosphor powder bonded by a binder such as epoxy resin, disposed and set on the electrode 5. The intermediate layer 3 is formed of either one of a light reflecting layer of about 10-20 μ thick formed of light reflecting powder such as barium titanate BaTiO₃ mixed in a similar binder and an opaque layer of about 5 μ thick formed of opaque or partially opaque powder mixed in a similar binder. The intermediate layer formed of either one of these two is disposed on, set and adhered to the layer 4. On this structure, is disposed a composite photoconductive laminate 20 comprising the first photoconductive layer 21 of about 50 to 80 μ thick provided with a porous electrode 1 such as a grid electrode made of parallel metal wires having a diameter of about 10 μ arranged at intervals of about 200 to 600 μ and the second photoconductive layer 22 of about 100 to 400 μ thick.

When voltage is applied between electrodes 1 and 5 and an image of light, X-rays or the like is projected onto the laminate 20, the resistance of the laminate 20 and and subsequently the current through the layer 4 varies and an amplified brighter visible output image is obtained.

Figure 3:
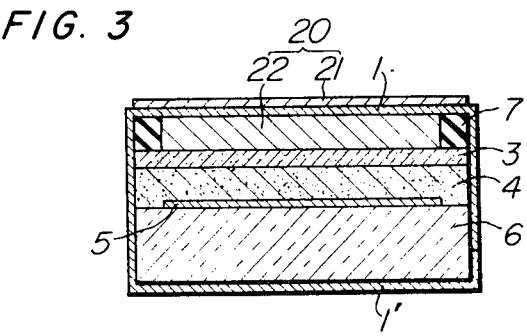
FIG. 3 shows a vertical cross section of an embodiment of a solid-state image converting device according to the invention.

An embodiment of the invention in the case of manufacturing a solid-state image converting device will be described in more detail hereinbelow, referring mainly to FIG. 3.

A Nesa electrode 5, an electroluminescent layer 4 and an intermediate layer 3 such as an opaque layer for preventing optical feedback are formed on a transparent glass support 6 by the conventional method. Here, the Nesa electrode 5 is formed not on the whole surface of the support plate 6 but leaving space therearound as shown in FIG. 3 for preventing contact with a thin metal wire 1' to be wound in the following step.

Figure 2:
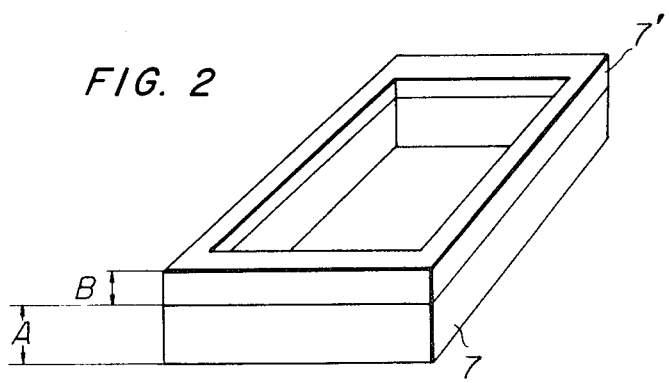
FIG. 2 is a schematic view of an example of spacer means to be used in working out the invention.

Next, a relatively thick second photoconductive layer 22 of about 100 to 400 μ is formed using spacer frame means 7, 7' (see FIG. 2) to form a uniform layer. The use of a spacer frame prevents the leak of photoconductive suspension material and enables the manufacture of a uniform photoconductive layer. The spacer means comprises a pair of frame members 7 and 7' bonded to each other by an adhesive or the like so as to be individually detachable. The thickness A of the spacer member 7 is selected to be equal to or a little less than the thickness of the second photoconductive layer 22. In order to form a thick uniform photoconductive layer having a thickness of about 100 to 400 μ by a single procedure, photoconductive material is mixed with thermal-setting binder such as epoxy resin and added with volatile diluent which melts the binder, such as acetone alcohol, thereby to form a fluid suspension mixture. Since the discrimination of the thickness of the photoconductive layer to be made becomes difficult by the addition of the diluent, the spacer formed of a pair of adhered frame members as shown in FIG. 2 is used to determine the thickness of the layer easily and accurately. The spacer 7, 7' is fixed on the layer 3 by an adhesive. After said mixture of the second photoconductive material is poured into the spacer, excessive material above the level of the spacer is removed by the doctor blade method or the like using the spacer as guide to leave a uniform and smooth layer. Then, the solvent is volatilized. The thickness B of the spacer member 7' is selected to be equal to or a little more than the amount of decrease in the thickness of the layer due to the volatilization of the solvent. When the solvent is volatilized, the mixture loses fluidity and forms a uniform and relatively stable photoconductive layer 22 of thickness A. Then the spacer member 7' is removed to leave only the member 7.

Next, a thin metal wire or wires 1' are wound around the composite structure formed of layers indicated by 3, 4, 5, 6, 7 and 22 at intervals of about 200 to 600 μ to form a foraminous electrode 1. The spacer member 7 serves to prevent the metal wire from unnecessarily embedding into the second photoconductive layer 22 which is not yet set hard enough, and to prevent a dielectric breakdown between the electrodes 1 and 5. Therefore, the spacer member 7 should be formed of an insulating material of low loss and high breakdown voltage as well as the ability of bearing a certain degree of mechanical pressure, such as polyester, vinyl resin. The foraminous electrode may also be formed of a metal grid.

After the provision of electrode 1, a first photoconductive layer 21 is formed on the layer 22 by coating the material from fluid state similar to the formation of the second photoconductive layer 22, by the screen method or the like and then volatilizing the solvent.

Then, the first and second photoconductive layers 21 and 22 are subjected to heat treatment together with the support plate 6 at a predetermined temperature and for a predetermined duration to set the binder in both layers.

Conductive paint such as made of silver is zonally coated and hardened on both ends of the support plate 6 either before or after the thermal setting of photoconductive layers. Then, after the thermal setting, unnecessary portions of the metal wire 1' existing on the surface of the glass support 6 are removed.

Thus, the composite laminate 21, 22 having the foraminous electrode 1 is formed.

In the embodiment described hereinabove, the foraminous electrode 1 is disposed on the upper surface of the second photoconductive layer 22 and the first photoconductive layer 21 is formed embedding this electrode 1.

When the electrode 1 is to be spaced from the layer 22 with part of the layer 21 interposed therebetween as shown in FIG. 1, the thickness A of the spacer member 7 is selected to be equal to or a little less than the sum of the thicknesses of the layer 22 and the layer 21 up to the plane on which electrode 1 is to be disposed and the dilution of material for the layer 21 is made higher compared with that for the layer 22. Namely, similar to the embodiment described above, suspension of material for the layer 22 is introduced and formed into layer using the spacer member 7' as guide, and the solvent is volatilized. Next, the same process is repeated with suspension of material for the layer 21. Then the spacer member 7' is removed and the foraminous electrode 1 formed of thin metal wires is disposed thereon. On this structure, the suspension material for the layer 21 is again coated and the solvent is volatilized. Thus, the thickness of layer 21 decreases to partially expose the electrode 1 above the surface as shown in FIG. 1. After the formation of layer 21, the composite photoconductive laminate is set by heating.

Although embodiments have been described of devices having a composite photoconductive laminate formed of two layers, a composite laminate having a greater number of layers can be made based on a similar principle. Here, materials for the respective layers may be either the same or different.

We claim:

1. A method for manufacturing a photoelectric device having a composite laminate of photoconductive layers, comprising the steps of:
    a. applying a mixture comprising a photoconductive powder, a thermosetting binder and a volatile diluent on one surface of a substrate;
    b. volatizing said volatile diluent;
    c. repeating steps (a) and (b) at least once to form a composite laminate having a plurality of photoconductive layers; and
    d. heating said composite laminate to set said plurality of photoconductive layers substantially simultaneously.

2. A method according to claim 1, comprising the further step of disposing a spacer frame on said substrate to define the boundaries of said layers within said frame.

3. A method for manufacturing a photoconductive device comprising a composite laminate of photoconductive layers, each of said layers including a photoconductive powder and a thermosetting binder and said laminate being provided with a foraminous electrode, comprising the steps of:
    a. disposing a composite spacer frame having separable upper and lower frame members of insulating material on a substrate;
    b. applying a mixture comprising a photoconductive powder, a thermosetting binder and a volatile diluent on said substrate within said frame;
    c. leveling the surface of said mixture to substantially the height of the top of said frame;
    d. volatizing said volatile diluent;
    e. repeating steps (b), (c) and (d) at least once to form a composite laminate having a plurality of photoconductive layers;
    f. removing said upper frame member;
    g. disposing a foraminous electrode on said composite laminate;
    h. applying a further mixture of photoconductive material, thermosetting binder and volatile diluent on said composite laminate;
    i. covering at least a part of said foraminous electrode with said further mixture;
    j. volatizing the diluent in said further mixture; and
    k. heating said composite laminate to thermally set said photoconductive layers substantially simultaneously.

* * * * *

UNITED STATES PATENT OFFICE
CERTIFICATE OF CORRECTION

Patent No. 3,616,003          Dated October 26, 1971

Inventor(s) Tadao KOHASHI et al

It is certified that error appears in the above-identified patent and that said Letters Patent are hereby corrected as shown below:

The Claim for Convention Priority is missing and should be inserted as follows:

--Japan, Patent Appln. N° 6824/68 filed Feb. 2, 1968. --.

Signed and sealed this 10th day of October 1972.

(SEAL)
Attest:

EDWARD M. FLETCHER, JR.          ROBERT GOTTSCHALK
Attesting Officer                 Commissioner of Patents